J. R. PETRIE.
TWO-PART PISTON RING.
APPLICATION FILED SEPT. 28, 1921.
1,426,766.
Patented Aug. 22, 1922.
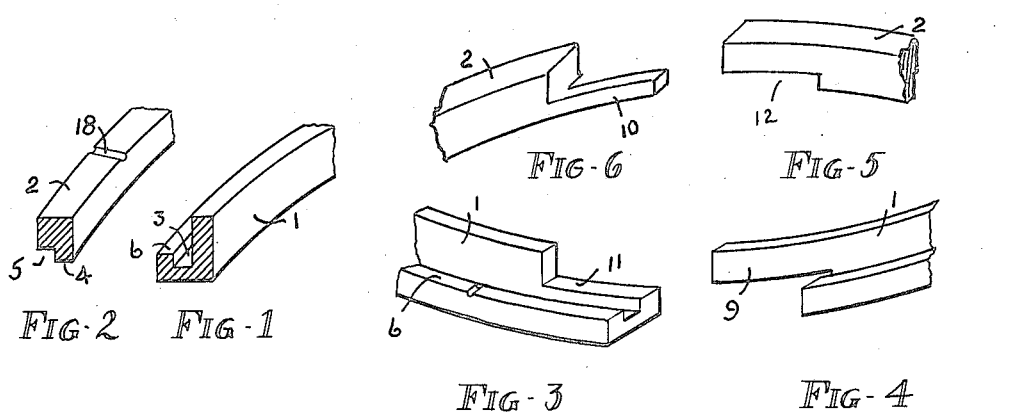
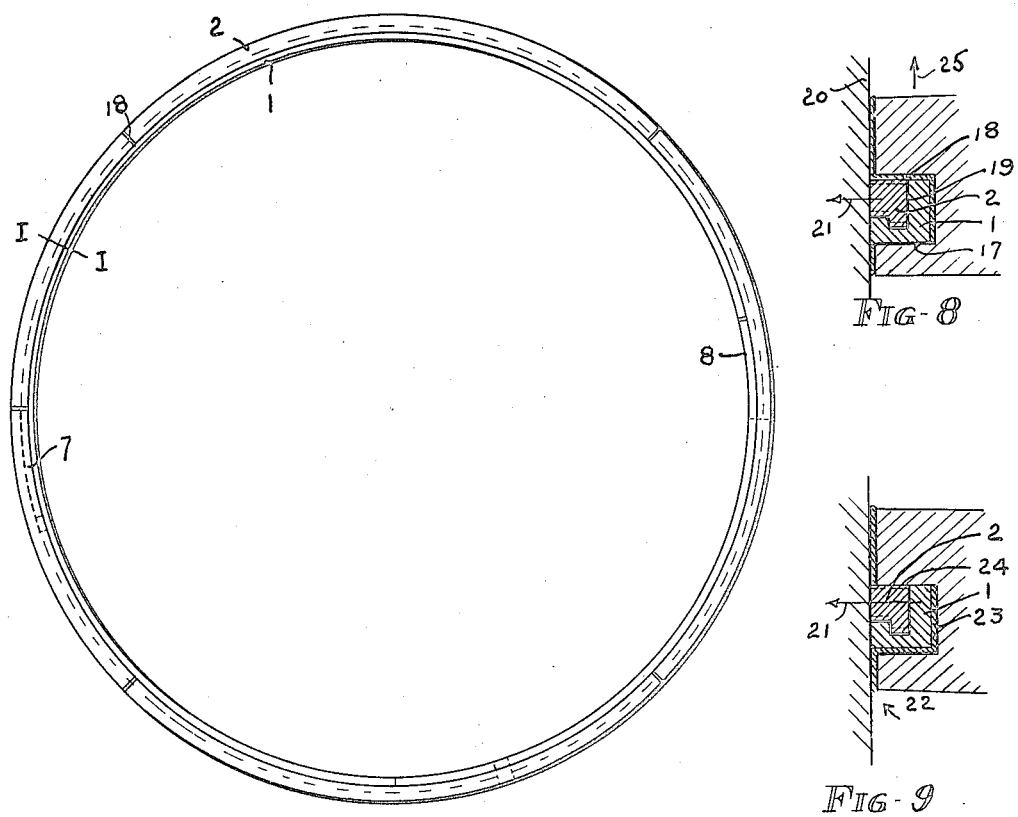
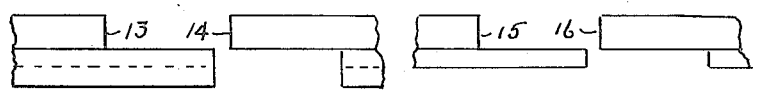
INVENTOR
James R. Petrie.
BY
Miller Henry & Boyken
ATTORNEY

UNITED STATES PATENT OFFICE.

JAMES R. PETRIE, OF SAN FRANCISCO, CALIFORNIA.

TWO-PART PISTON RING.

1,426,766.  Specification of Letters Patent.  Patented Aug. 22, 1922.

Application filed September 28, 1921. Serial No. 503,944.

*To all whom it may concern:*

Be it known that I, JAMES R. PETRIE, a citizen of the United States, and resident of the city and county of San Francisco, State of California, have invented new and useful Improvements in Two-Part Piston Rings, of which the following is a specification.

My invention has for its object a piston ring particularly adapted to packing of the joint between the piston and cylinders of internal explosion engines whereby a better joint for retaining the compression and power stroke is attained and with a minimum of lubrication.

Other objects will appear from the drawings and specifications which follow:

Referring to the drawings:

Fig. 1 is a cross section of one of my ring elements on the line I—I of Fig. 7.

Fig. 2 is a cross section of the second element on the line I—I of Fig. 7.

Fig. 3 is a perspective view of one of the ends, and

Fig. 4 is a perspective view of the other end of the joint in the first ring element, and adapted to dovetail with the end of Fig. 3.

Figs. 5 and 6 are the ends of the second ring element and adapted to dovetail to form the joint therein.

Fig. 7 is a plan view of the assembled ring.

Figs. 8 and 9 show the ring in position in the engine piston and illustrate diagrammatically the movements and direction of force of the respective piston and cylinders.

Figs. 10 and 11 are front views of the joints of the two ring members.

Throughout the figures similar numerals refer to identical parts.

The ring of my invention consists of two parts or elements indicated generally by the numerals 1 and 2 which are formed to interengage together forming a completed two-part ring of rectangular section as shown in Figs. 7, 8, 9. The member 1 is channeled at 3 to receive the tongue 4 of the L-shaped member 2. The surface 5 at such time lying upon the surface 6. The member 2 is jointed as shown in Figs. 5, 6, which ends when brought together form a joint in the member 2 of the completed ring as shown at 7, Fig. 7, and the ends of member 1 as shown in Figs. 3 and 4, when brought together are indicated in completed ring at 8 of Fig. 7. It will now be seen that there is no opening between the upper and lower part of the completed ring. The tongues 9, 10 co-operating with the passageways 11, 12, respectively, and the continuous portion of the member 1 bridging the joint portion of the member 2 and the continuous portion of the member 2 bridging the jointed portion of the member 1. A side view of the joint in the member 1 being shown in Fig. 10, and side view of the joint of Fig. 2 being shown in Fig. 11. In these two figures the ends are separated but it is to be understood that when the ring is sprung into place in its groove in the piston, these ends 13 and 14, 15 and 16, respectively, substantially abut against each other.

The operation is as follows: Referring particularly to Fig. 8, the piston making a compression stroke in the direction of the arrow 25, the ring seats against the bottom of the piston groove at 17, the compressed gas passing freely through the slots 18 of the member 2 and thus against the surface thereof at 19 causes the ring member 2 to press against the cylinder wall 20 in the direction of the arrow 21, thus effecting a substantial seal during the up stroke. On the down or power stroke opposite to the direction of the arrow 25 the action will be the same because of the compressed gases acting against the surface 19. On the suction stroke as shown in Fig. 9 the member 1 is held against the upper surface 24 of the groove by the suction, or in other words by the excessive atmospheric pressure in the direction of the arrow 22, so that an effective seal is provided for either direction of stroke and for either direction of pressure. It is to be understood that the clearance shown in these Figures 8 and 9 is much greater than in actual practice for the purpose of facilitating the illustration.

I claim:

1. A two-part piston ring comprising an L-shaped part constructed and adapted to dovetail in to a second part, the two parts forming a two-part ring of rectangular section, and each of said parts having a joint consisting of ends formed to intermesh with each other and the parts assembled with the said joints opposite each other and grooves in the outer surface of the L part in the assembled ring to pass pressure between the parts.

2. A two-part piston ring comprising an L-shaped part constructed and adapted to dovetail in to a second part, the two parts forming a two-part ring of rectangular section, and each of said parts having a joint consisting of ends formed to intermesh with each other and the parts assembled with the said joints opposite each other and grooves in the outer surface of the L part in the assembled ring to pass pressure between the parts, and the parts assembled with the said joints opposite each other.

JAMES R. PETRIE.